US009488176B2

(12) United States Patent
Moeller

(10) Patent No.: US 9,488,176 B2
(45) Date of Patent: Nov. 8, 2016

(54) RADIAL VALVES AND PUMPS INCLUDING RADIAL VALVES

(71) Applicant: National Oilwell Varco, L.P., Houston, TX (US)

(72) Inventor: Manuel Moeller, Tulsa, OK (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 226 days.

(21) Appl. No.: 14/246,807

(22) Filed: Apr. 7, 2014

(65) Prior Publication Data

US 2015/0285247 A1  Oct. 8, 2015

(51) Int. Cl.
| F04C 14/24 | (2006.01) |
| F04B 47/00 | (2006.01) |
| F04B 53/10 | (2006.01) |
| F16K 15/16 | (2006.01) |

(52) U.S. Cl.
CPC .............. *F04C 14/24* (2013.01); *F04B 47/00* (2013.01); *F04B 53/10* (2013.01); *F16K 15/16* (2013.01)

(58) Field of Classification Search
CPC ...... F16K 15/025; F16K 15/08; F16K 15/12; F16K 15/10; F16K 11/10; F16K 15/02; F16K 17/04; F16K 17/0413; F04C 14/24; F04B 1/0456
USPC ...................... 137/511–543.23; 417/454, 560
See application file for complete search history.

(56) References Cited

U.S. PATENT DOCUMENTS

| 550,730 | A | * | 12/1895 | Stone | ...................... F16K 15/08 |
| | | | | | 137/516.15 |
| 793,214 | A | * | 6/1905 | Neuhaus | ................. F16K 15/08 |
| | | | | | 137/516.15 |
| 2,249,042 | A | * | 7/1941 | Robinson | ................ F16K 15/08 |
| | | | | | 137/454.4 |
| 2,420,056 | A | * | 5/1947 | Seligmann | .............. F16K 15/08 |
| | | | | | 137/454.4 |
| 2,637,519 | A | * | 5/1953 | Ferrari | ..................... F04B 39/10 |
| | | | | | 137/512 |
| 3,698,423 | A | * | 10/1972 | Dahlquist | ............... F16K 15/16 |
| | | | | | 137/454.2 |
| 4,278,106 | A | | 7/1981 | Cunningham | |
| 4,313,462 | A | | 2/1982 | Adamson | |
| 4,483,363 | A | * | 11/1984 | Madoche | ............ F04B 39/1033 |
| | | | | | 137/329.04 |
| 4,484,365 | A | | 11/1984 | Murguet et al. | |

(Continued)

FOREIGN PATENT DOCUMENTS

WO  2013/048792 A1  4/2013

OTHER PUBLICATIONS

European Search Report dated Sep. 24, 2015, for European Application No. 15162621.5 (5 p.).

*Primary Examiner* — Craig Schneider
*Assistant Examiner* — Daniel P Donegan
(74) *Attorney, Agent, or Firm* — Conley Rose, P.C.

(57) ABSTRACT

A valve assembly includes a valve body having an outer surface, and an inner fluid chamber having a central axis. The valve body also has an aperture extending radially through the valve body from the outer surface to the inner fluid chamber. The valve assembly also includes a valve member movably coupled to the valve body. The valve member is configured to move radially relative to the valve body between a closed position preventing fluid flow through the aperture and an open position allowing fluid flow through the aperture. The valve assembly also has a retainer extending across the aperture and the valve member and attached to the valve body. The valve assembly further includes a biasing member coupled to the retainer and the valve member. The biasing member is configured to bias the valve member to the closed position.

18 Claims, 8 Drawing Sheets

(56) References Cited

U.S. PATENT DOCUMENTS

| | | | |
|---|---|---|---|
| 4,526,195 A * | 7/1985 | Humphrey | B23P 15/001 137/512.1 |
| 4,531,372 A | 7/1985 | Slabaugh | |
| 4,819,689 A | 4/1989 | Owsley et al. | |
| 4,919,166 A * | 4/1990 | Sims | A63B 21/0083 137/493 |
| 5,061,278 A | 10/1991 | Bicer | |
| 5,230,128 A | 7/1993 | Norman | |
| 5,331,998 A | 7/1994 | Sperry | |
| 5,427,506 A | 6/1995 | Fry et al. | |
| 5,682,849 A | 11/1997 | Reguiro | |
| 5,695,325 A | 12/1997 | Sperry | |
| 6,626,151 B2 | 9/2003 | Boehm et al. | |
| 7,025,085 B2 | 4/2006 | Price et al. | |
| 7,641,175 B1 | 1/2010 | Blume | |
| 7,959,420 B1 | 6/2011 | Sperry | |
| 8,141,849 B1 | 3/2012 | Blume | |
| 8,308,455 B2 | 11/2012 | Wallis et al. | |
| 8,430,646 B2 | 4/2013 | Shade et al. | |
| 8,496,454 B2 | 7/2013 | Wallis et al. | |
| 2004/0016459 A1 * | 1/2004 | Thompson | F16K 17/082 137/512.1 |
| 2004/0020450 A1 | 2/2004 | Lawes | |
| 2004/0191099 A1 | 9/2004 | Moradmand et al. | |
| 2005/0206227 A1 | 9/2005 | Kim | |
| 2008/0063538 A1 | 3/2008 | Landrum et al. | |
| 2008/0230028 A1 | 9/2008 | Dingle | |
| 2011/0123376 A1 | 5/2011 | Aritomi et al. | |
| 2012/0223267 A1 | 9/2012 | Marica | |
| 2013/0199634 A1 * | 8/2013 | Hoppe | F16K 17/00 137/513.7 |
| 2014/0348677 A1 * | 11/2014 | Moeller | F04B 53/1027 417/559 |
| 2015/0132157 A1 * | 5/2015 | Whaley | F04B 53/14 417/321 |
| 2015/0285247 A1 * | 10/2015 | Moeller | F04C 14/24 251/313 |

* cited by examiner

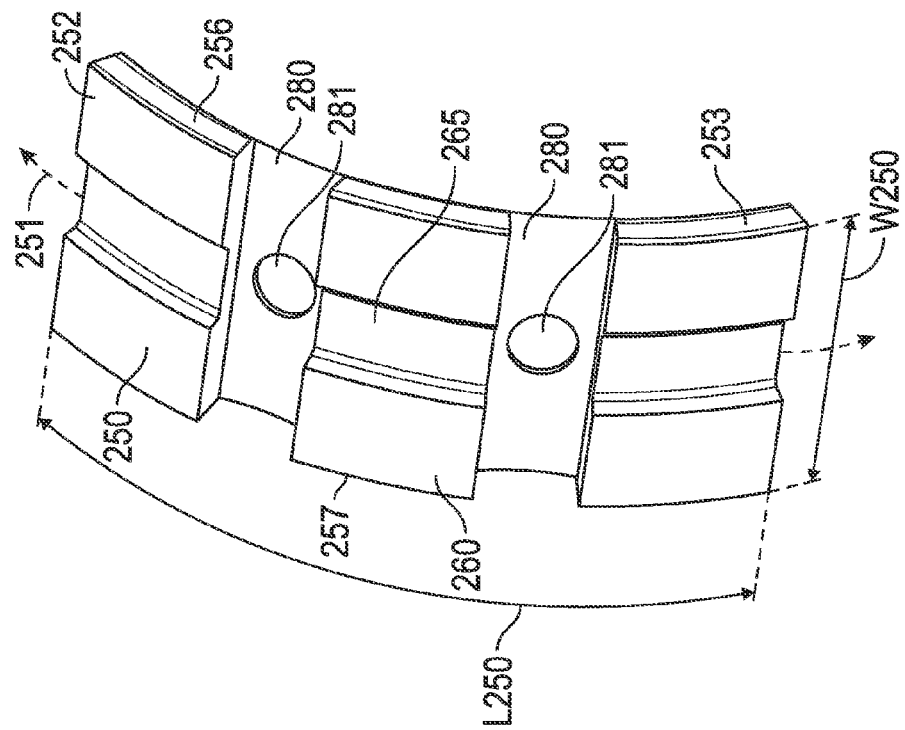
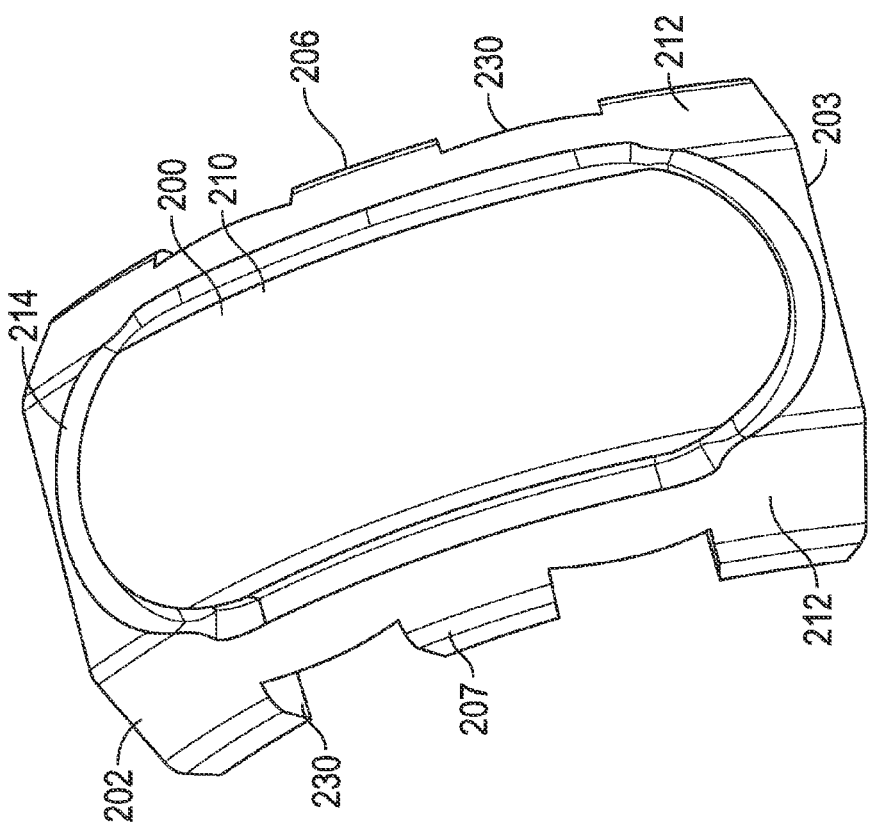

RADIAL VALVES AND PUMPS INCLUDING RADIAL VALVES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of Technology

The disclosure relates generally to pumps, and more specifically, positive displacement pumps, such as reciprocating pumps applied to drilling mud and well service applications, and to radial valves used therein to control the flow of the pumped fluid into and out of such pumps. More particularly, the disclosure relates to a valve module for use in positive displacement pumps.

2. Background Information

Positive displacement pumps are used in various pumping applications. For example, reciprocating pumps are used in typical drilling operations to pressurize an abrasive slurry of solids and liquids known as drilling mud, which is then conveyed to the bottom of a borehole that is being drilled in the earth. The pressurized mud is used to maintain appropriate borehole pressure, lubricate and cool a downhole drill bit, and carry loosened sediment and rock cuttings from the borehole bottom to the surface. At the surface, the cuttings and sediment are removed from the returning drilling mud, and the now-filtered drilling mud may be recycled and pumped back to the borehole bottom.

Suction and discharge valves are used in reciprocating pumps to control the flow of fluid into and out of the pump's cylinders where the fluid is pressurized. Due to the highly abrasive nature of the particles often present in the slurry being pressurized, the valves and seals of the pumps must be designed to resist harsh abrasion, while maintaining positive sealing action under relatively high operating pressures. Additionally, the valve elements and the structural components retaining them in the pump are exposed to very high and cyclic pressures. For example, a valve module containing a valve assembly may pressurize, reaching up to 7,500 psi or more, and then may relieve down to 0 psi many times per minute. This high cyclic pressure changes generate stresses that can significantly impact the life of the components. It is common and expected that seals, gaskets, and other valve components will wear or fail requiring routine replacement and necessitating that the pump be shut down and repaired. Repairs to the valve module are time-consuming and expensive. The cost and time of maintenance and repairs are attributed in part to the construction of a conventional pump, which includes separate suction and discharge valve modules having separate assemblies for each valve within the modules. Removal and replacement requires handling of the multiple components. In addition, conventional pump designs result in bulky, heavy equipment.

BRIEF SUMMARY OF THE DISCLOSURE

These and other needs in the art are addressed in one embodiment by a valve assembly. In an embodiment, the valve assembly includes a valve body having a first end, a second end opposite the first end, an outer surface extending from the first end to the second end, and an inner surface extending from the first end to the second end. The inner surface defines an inner fluid chamber having a central axis. The valve body also has a first aperture extending radially through the valve body from the outer surface to the inner fluid chamber. The valve assembly also includes a first valve member movably coupled to the valve body. The first valve member is configured to move radially relative to the valve body between a closed position preventing fluid flow through the first aperture and an open position allowing fluid flow through the first aperture. The valve assembly also has a first retainer extending across the first aperture and the first valve member. The first retainer has a first end fixedly attached to the valve body. Still further, the valve assembly includes a first biasing member coupled to the first retainer and the first valve member. The first biasing member is configured to bias the first valve member to the closed position.

In another embodiment, a valve assembly includes a valve body having a first end, a second end axially opposite the first end, an outer surface extending axially from the first end to the second end, and inner surface defining an inner fluid chamber having a central axis. The valve body includes a first elongate slot having a length and a width less than the length, and the first elongate slot extends radially through the valve body from the outer surface to the inner chamber. The valve assembly also includes a first elongate valve member having a length and a width less than the length. The first valve member is movably coupled to the valve body and is configured to move radially relative to the valve body between a closed position preventing fluid flow through the first slot and an open position allowing fluid flow through the first slot.

In another embodiment, a pump includes a valve block having a first bore with a central axis and extending from an outer surface of the valve block, a second bore extending from the outer surface of the valve block to the first bore, and a third bore extending from the outer surface of the valve block to the first bore. The pump also includes a valve assembly disposed in the first bore. The valve assembly has a valve body having a first end, a second end axially opposite the first end, an outer surface extending axially from the first end to the second end, and inner surface defining an inner fluid chamber. The valve body also includes an inlet aperture and an outlet aperture axially spaced from the inlet aperture, wherein each aperture extends radially through the valve body from the outer surface of the valve body to the inner fluid chamber. The inlet aperture is axially aligned with the second bore of the valve block and the outlet aperture is axially aligned with the third bore of the valve block. In addition, the valve assembly includes a first valve member positioned in the inner fluid chamber and movably coupled to the valve body. The first valve member is configured to move radially relative to the valve body between a closed position preventing fluid flow through the inlet aperture and an open position radially spaced from the valve body and configured to allow fluid flow through the inlet aperture. Still further, the valve assembly includes a second valve member positioned outside the valve body and movably coupled to the valve body. The second valve member is configured to move radially relative to the valve body between a closed position preventing fluid flow through the outlet aperture and an open position radially spaced from the valve body and configured to allow fluid flow through the outlet aperture.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the disclosed embodiments, reference will now be made to the accompanying drawings in which:

FIG. 6 is a radially outer-side perspective view of the suction valve member of FIG. 5;

FIG. 7 is a radially inner-side perspective view of one discharge valve member of FIG. 2;

NOTATION AND NOMENCLATURE

Figure 1:
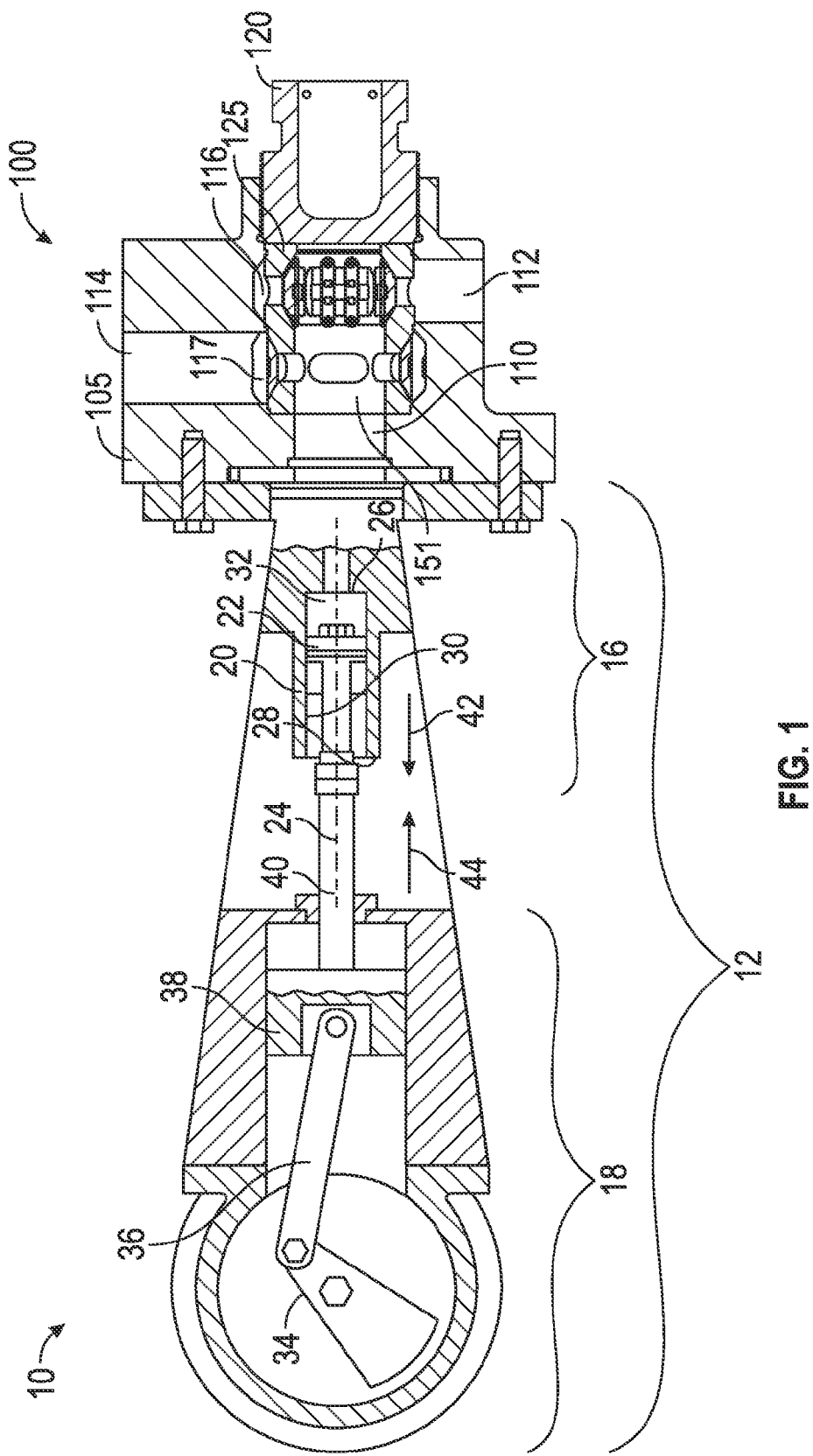
FIG. 1 is a partial, cross-sectional, schematic view of an embodiment of a reciprocating positive displacement pump in accordance with principles disclosed herein.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness of the figure, one or more components or aspects of a component may be omitted or may not have reference numerals identifying the features or components that are identified elsewhere. In addition, within the specification, including the drawings, like or identical reference numerals may be used to identify common or similar elements.

The terms "including" and "comprising" are used herein, including in the claims, in an open-ended fashion, and thus should be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, X may be based on Y and any number of other factors. In addition, as used herein, including the claims, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis. Furthermore, any reference to a relative direction or relative position in the description and the claims will be made for purposes of ease of description or clarification, with examples including "top," "bottom," "up," "upward," "left," "leftward," "down," "lower," "clock-wise," and the like. For example, a relative direction or a relative position of an object or feature pertains to the orientation as shown in a figure or as described. If the object were viewed from another orientation, it may be appropriate to describe the direction or position using an alternate term.

DETAILED DESCRIPTION OF THE PREFERRED EMBODIMENTS

Referring now to FIG. 1, an embodiment of a positive displacement pump 10 for pumping a fluid (e.g., drilling mud) is shown. In this embodiment positive displacement pump 10 is a reciprocating pump including a power end assembly 12 and a fluid valve module 100 coupled to power end assembly 12. Power end assembly 12 includes a piston-cylinder fluid section 16 proximal valve module 100 and a power section 18 distal valve module 100. Fluid section 16 includes a cylinder 20 and a piston 22 disposed therein. Cylinder 20 has a central axis 24, a first end 26, a second end 28, and a through-bore 30 extending axially between ends 26, 28. Piston 22 is coaxially disposed within bore 30 and slidingly engages the inner surface of cylinder 20. Piston 22 and cylinder 20 define a chamber 32 within bore 30 axially positioned between piston 22 and first end 26. Power section 18 includes a crankshaft 34, a connecting rod 36, and a crosshead 38. One end of connecting rod 36 is pivotally coupled to crankshaft 34 and the other end of connecting rod 36 is pivotally coupled to crosshead 38. An extension rod 40 couples crosshead 38 to piston 22. During pumping operations, a motor (not shown) powers the rotation of crankshaft 34. The rotational motion of crankshaft 34 is translated into the reciprocating axial displacement of piston 22 relative to cylinder 20. As piston 22 moves axially within bore 30 in a first direction represented by arrow 42, the volume within chamber 32 increases; and as piston 22 moves axially within bore 30 in a second direction represented by arrow 44 (opposite first direction 42), the volume within chamber 32 decreases.

Figure 2:
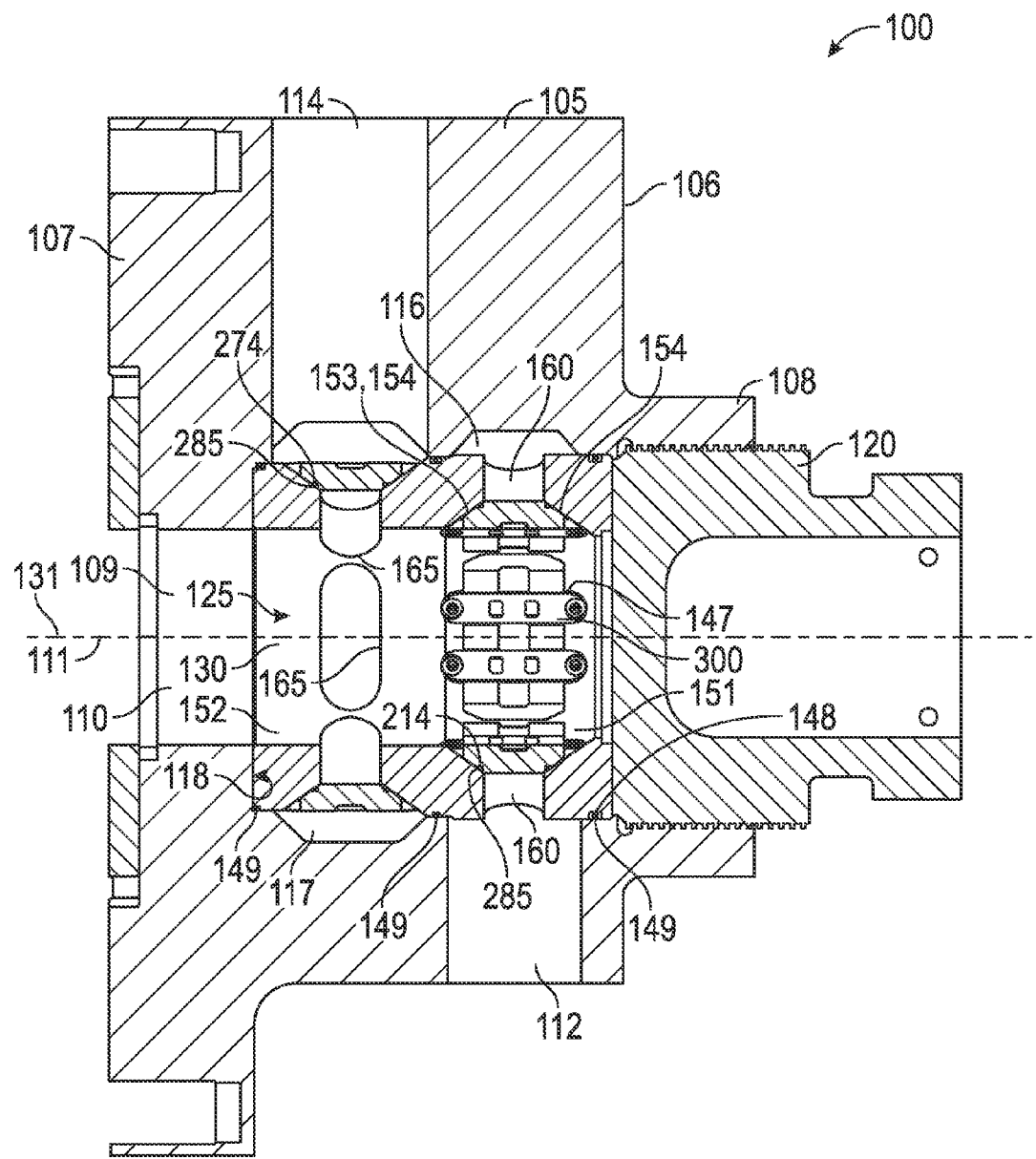
FIG. 2 is an enlarged cross-sectional view of the valve module of FIG. 1.

Referring now to FIGS. 1 and 2, fluid valve module 100 includes a valve block 105, a generally cylindrical valve assembly 125 disposed within valve block 105, and a threaded retaining end cap 120 threadably coupled to valve block 105 to secure valve assembly 125 therein. Valve block 105 has a first end 107, a second end 108, a radially outer surface 106 extending between ends 107, 108, and an inner surface 109 extending between ends 107, 108. Inner surface 109 defines a through-bore 110 extending through valve block 105 from end 107 to end 108. Through-bore 110 has a central axis 111, which may also be referred to herein as the valve axis.

Valve block 105 also includes a suction or inlet port 112 extending from outer surface 106 to through-bore 110 and an outlet or discharge port 114 extending from the outer surface 106 to through-bore 110. In this embodiment, each port 112, 114 is a bore formed in valve block 105, which extends from outer surface 106 to through-bore 110. In this embodiment, ports 112, 114 are circumferentially and axially spaced apart. In particular, discharge port 114 is axially positioned proximal first end 107, and thus, is axially positioned between power end assembly 12 and suction port 112.

The diameter of through-bore 110 varies along its axial length. In particular, inner surface 109 of valve block 105 includes an annular planar shoulder 118 and a pair of axially spaced annular recesses 116, 117. In this embodiment, shoulder 118 is axially positioned proximal end 108 and recess 117 is axially positioned between shoulder 118 and recess 116. Through-bore 110 has a decreased diameter between end 107 and shoulder 118, and an increased diameter along each recess 116, 117. As will be described in more detail below, recesses 116, 117 supply fluid to and receive fluid from valve assembly 125, respectively, and thus, may also be referred to herein as flow or fluid distribution channels. As best shown in FIG. 2, flow distribution channel 116 is radially aligned with suction port 112 and in fluid communication with suction port 112, and further, flow distribution channel 117 is radially aligned with discharge port 114 and in fluid communication with discharge port 114. Inner surface 118 is internally threaded at end 108 to allow end cap 120 to be threaded into through-bore 110 and secured to valve block 105.

Referring still to FIG. 2, valve assembly 125 is seated in through-bore 110 between shoulder 118 and end cap 120. In particular, with valve assembly 125 disposed in through-bore 110, end cap 120 is threaded into through-bore 110 at end 108 to axially compress valve assembly 125 between shoulder 118 and end cap, thereby maintaining the axial position of valve assembly 125 in valve body 105. Thus, valve assembly 125 is held in position within through-bore 110 by end cap 120. Valve assembly 125 extends axially across ports 112, 114 and controls fluid flow through ports 112, 114. More specifically, valve assembly 125 controls one-way fluid flow from suction port 112 to discharge port 114. Through-bore 110 and valve assembly 125 are in fluid communication with chamber 32 of power end assembly 12 previously described.

Figure 3:
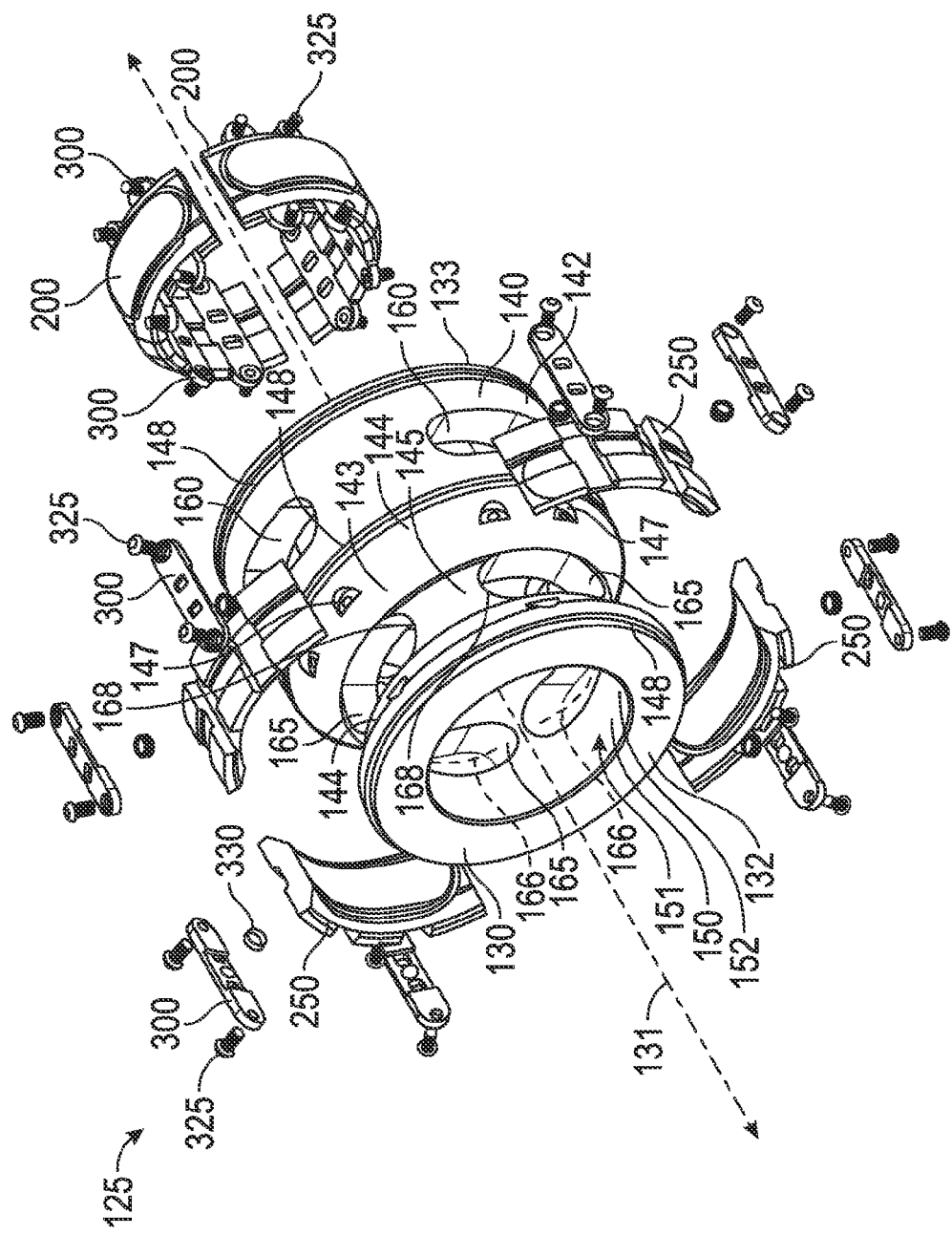
FIG. 3 is a exploded perspective view of the valve module of FIG. 2.

Referring now to FIG. 3, in this embodiment, valve assembly 125 includes a generally cylindrical tubular valve body 130, a plurality of suction or inlet valve members 200 movably coupled to valve body 130, and a plurality of discharge or outlet valve members 250 movably coupled to valve body 130. A plurality of retainers 300 couple valve members 200, 250 to valve body 130 and a plurality of biasing members 330 bias valve members 200, 250 into engagement with valve body 130. In particular, each retainer 300 extends axially (relative to axis 111) across a corresponding valve member 200, 250 and one biasing member 330 is radially positioned (relative to axis 111) between each retainer 300 and the corresponding valve member 200, 250. In this embodiment, each biasing members 330 is a coiled spring that is compressed between one retainer 300 and the corresponding valve member 200, 250. However, in other embodiments, different types of biasing members may be employed such as torsional springs or resilient rubber elements.

Referring still to FIG. 3, valve body 130 has a central or longitudinal axis 131, a first end 132, a second end 133 axially opposite first end 132, a radially outer surface 140 extending axially between ends 132, 133, and a radially inner surface 150 extending axially between ends 132, 133. Axes 111, 131 are coaxially aligned when valve body 130 is disposed in through-bore 110 of valve body 105. Inner surface 150 defines an inner fluid chamber 151 extending axially through valve body 130. Valve body 130 also includes a plurality of circumferentially spaced suction or inlet apertures 160 and a plurality of circumferentially spaced discharge or outlet apertures 165. Apertures 160 are axially spaced from apertures 165. Each aperture 160, 165 extends radially through valve body 130 from outer surface 140 to the inner fluid chamber 151. In this embodiment, four uniformly circumferentially spaced inlet apertures 160 are provided proximal end 133 and four uniformly circumferentially spaced outlet apertures 165 are provided proximal end 132. As best shown in FIG. 2, inlet apertures 160 are radially aligned with suction port 112 and distribution channel 116, and outlet apertures 165 are radially aligned with discharge port 114 and distribution channel 117.

Figure 4:
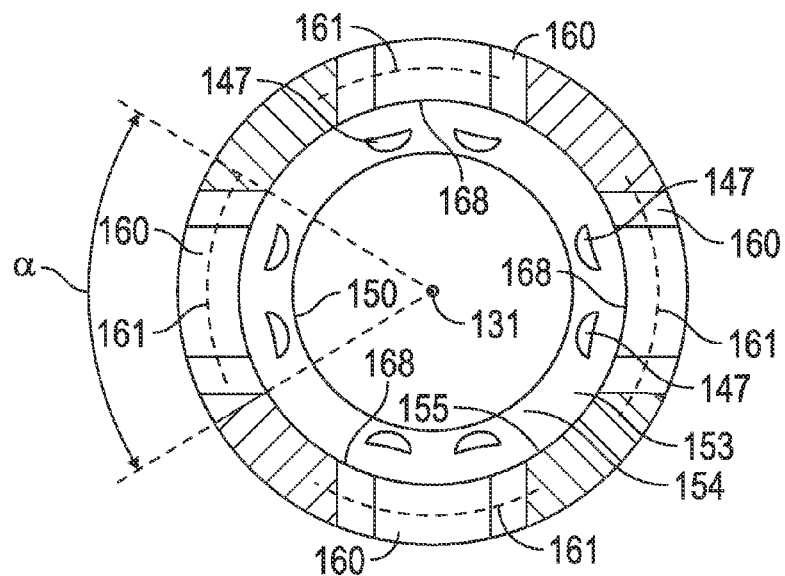
FIG. 4 is a cross-sectional view of the valve module of FIG. 2 illustrating the suction apertures.

Referring now to FIGS. 3 and 4, in this embodiment, each aperture 160, 165 is an elongate, oval slot having a length (measured circumferentially) and a width (measured axially) less than its length. As best shown in FIG. 4, each aperture 160 has a longitudinal, i.e. lengthwise, axis 161 extending circumferentially about the central axis 131. In this embodiment, the four axes 161 of the four apertures 160 are disposed at the same axial position along axis 131 and circumferentially aligned about central axis 131. However, other arrangements for the plurality of suction apertures 160 are contemplated. Similarly as shown in FIG. 3, each aperture 165 has a longitudinal, i.e. lengthwise, axis 166 extending circumferentially about the central axis 131. In this embodiment, the four axes 166 of the four apertures 165 are disposed at the same axial position along axis 131 and circumferentially aligned about central axis 131.

Referring still to FIG. 3, outer surface 140 of valve body 130 includes a cylindrical surface 142 axially adjacent end 133 and an annular concave recess or trough 143 axially adjacent inner end 132. Trough 143 is defined by a pair of axially spaced tapered, frustoconical sides 144 and a cylindrical base surface 145 extending axially between sides 144. Discharge slots 165 are disposed along surface 145. As best shown in FIG. 4, multiple circumferentially spaced attachment recesses 147 are disposed along each side 144. Each recess 147 on one side 144 is disposed axially opposite a corresponding recess 147 on the other side 144. The portions of outer surface 140 adjacent and surrounding each aperture 165 serves as outwardly-facing valve seat 168 for a corresponding valve member 250.

Referring again to FIG. 3, outer surface 140 also includes a plurality of axially spaced annular seal grooves 148. A first seal groove 148 is axially positioned at end 132, a second seal groove 148 is axially positioned between trough 143 and surface 142, and a third seal groove 148 is axially positioned at end 133. As shown in FIG. 2, an annular seal member 149 (e.g., O-ring seal) is disposed in each seal groove 148 to seal between valve body 130 and valve block 105.

Referring now to FIGS. 2-4, inner surface 150 of valve body 130 includes a cylindrical surface 152 extending axially from end 132 and an annular concave recess or trough 153 axially adjacent end 133. Surface 152 is radially opposite trough 143 and trough 153 is radially opposite surface 142. Trough 153 is defined by a pair of axially spaced tapered, frustoconical sides 154 and a cylindrical base surface 155 extending axially between sides 154. Apertures 160 are disposed along base surface 155. Multiple circumferentially spaced attachment recesses 147 are disposed along each side 154. Each recess 147 on one side 154 is disposed axially opposite a corresponding recess 147 on the other side 154. The portions of inner surface 150 adjacent and surrounding each aperture 160 serves as inwardly-facing valve seat 168 for a corresponding valve member 200.

As best shown in FIG. 4, each of the four apertures 160 subtends an angle alpha, α, of less than 90° measured about the central axis. For convenience, as shown, angle alpha may be measured between the two most circumferentially distal points on the edge where slot 160 intersects surface 155 of concave trough 153. In various embodiments, the angle alpha varies depending on the number of apertures 160 and the desired flow area for the slots, and thus, in the various embodiments alpha is greater than zero degrees and less than 180°, for example. Though not shown separately for slots 165, each of the four slots 165 also subtends an angle alpha, α, measured about the central axis. For convenience, angle alpha for the slots 165 may be measured between the two most circumferentially distal points on the edge where slot 165 intersects base surface 145 of trough 143. In some embodiments, the angle alpha for discharge slots 165 differs from the angle alpha of suction apertures 160.

Figure 5:
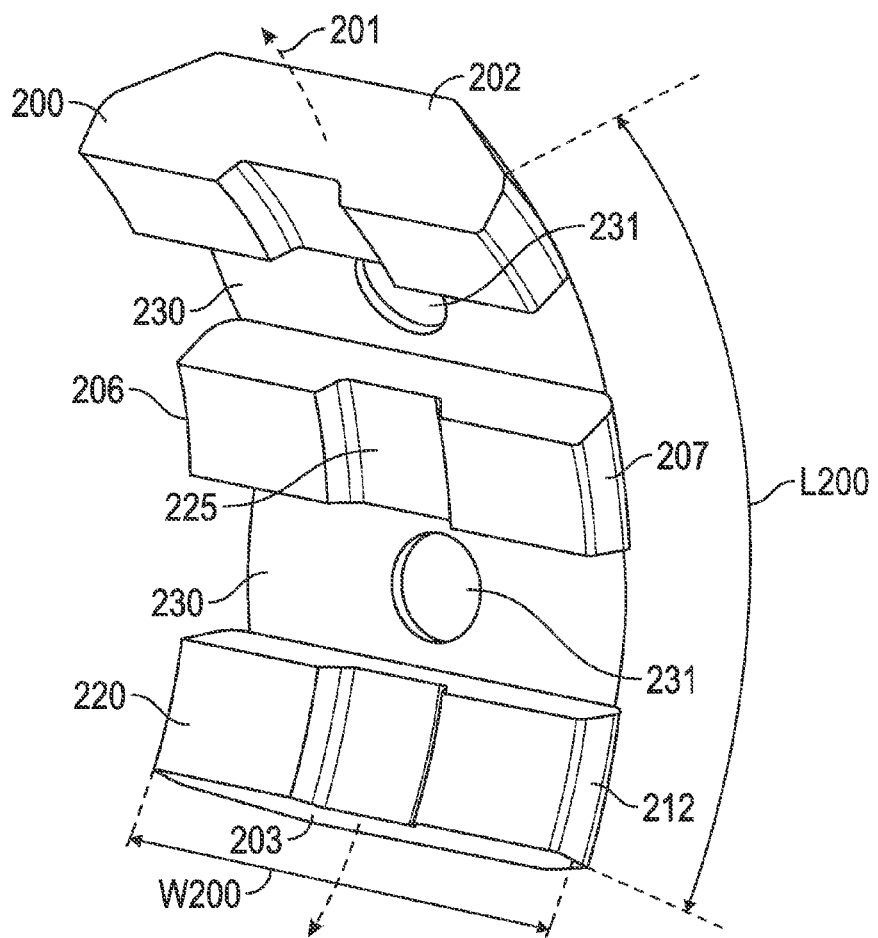
FIG. 5 is a radially inner-side perspective view of one suction valve member of FIG. 2.

Referring now to FIGS. 5 and 6, each suction valve member 200 is an elongate, arcuate (i.e. curved) plate having a central or longitudinal axis 201, a first end 202, a second end 203 opposite first end 202, a first lateral side 206 extending between ends 202, 203, a second lateral side 207 extending between ends 202, 203 parallel to side 206, a radially outer surface 210, and a radially inner surface 220. Surfaces 210, 220 extend between ends 202, 203 and sides 206, 207. Each suction valve member 200 has an arch length L200 measured parallel to axis 201 between ends 202, 203, and a width W200 measured perpendicular to axis 201 between lateral sides 206, 207. Width W200 is less than the arch length L200.

Inner surface 220 includes a plurality of parallel recesses or channels 230 and an arcuate recess or channel 225 oriented perpendicular to channels 230. Each channel 230 extends between sides 206, 207 and is oriented perpendicular to axis 201, sides 206, 207, and channel 225. Channel 225 extends between ends 202, 203 and is oriented parallel to axis 201. In this embodiment, channel 225 is located half-way between sides 206, 207. In addition, lateral channels 230 intersect arcuate channel 225 and are deeper than channel 225 Inner surface 220 of each valve member 200 also includes a circular recess 231 disposed in each channel 230 half-way between sides 206, 207. As will be described in more detail below, each recess 231 defines a seat for a corresponding biasing member 330. Radially outer surface 210 includes an arcuate chamfer 212 adjacent each side 206, 207 and a seal groove 214 that follows an generally oval path, intersecting the two chamfers 212 and running adjacent the ends 202, 203.

Figure 8:
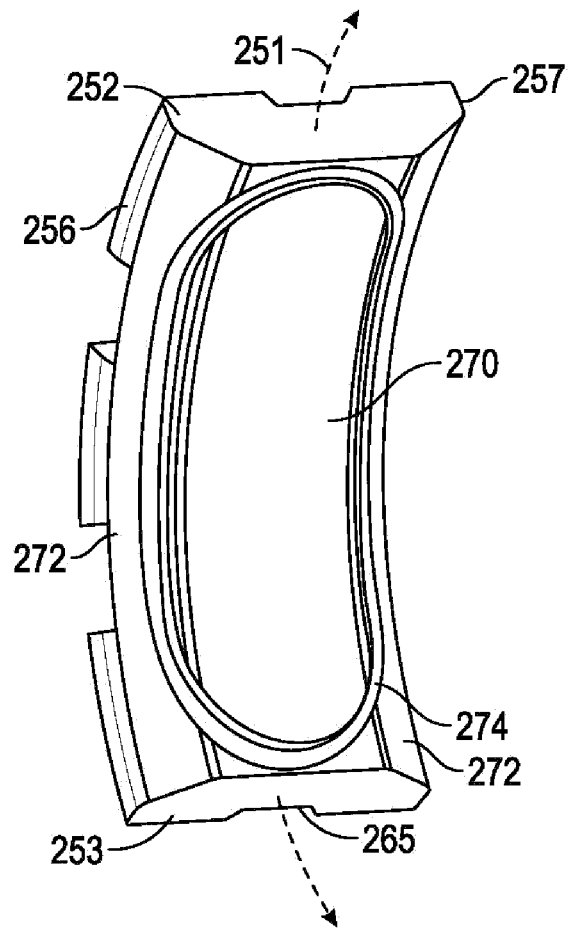
FIG. 8 is a radially outer-side perspective view of the discharge valve member of FIG. 7.

Referring now to FIGS. 7 and 8, each discharge valve member 250 is an elongate, arcuate (i.e. curved) plate having a longitudinal axis 251, a first end 252, a second end 253 opposite first end 252, a first lateral side 256 extending between ends 252, 253, a second lateral side 257 extending between ends 252, 253 parallel to side 256, a radially outer surface 260, and a radially inner surface 270. Surfaces 260, 270 extend between ends 252, 253 and sides 256, 257. Each discharge valve member 250 has an arch length L250 measured parallel to axis 251 between ends 252, 253, and a width W250 measured perpendicular to axis 251 between lateral sides 256, 257. The width W250 is less than the arch length L250.

Outer surface 260 includes a plurality of parallel recesses or channels 280 and an arcuate recess or channel 265 oriented perpendicular to channels 280. Each channel 280 extends between sides 256, 257 and is oriented perpendicular to axis 251, sides 256, 257, and channel 265. Channel 265 extends between ends 252, 253 and is oriented parallel to axis 251. In this embodiment, channel 265 is located half-way between sides 256, 257. In addition, lateral channels 280 intersect arcuate channel 265 and are deeper than channel 265 Outer surface 260 of each valve member 250 also includes a circular recess 281 disposed in each channel 280 half-way between sides 256, 257. As will be described in more detail below, each recess 281 defines a seat for a corresponding biasing member 330. Radially outer surface 270 includes an arcuate chamfer 272 adjacent each side 256, 257 and a seal groove 274 that follows an generally oval path, intersecting the two chamfers 272 and running adjacent the ends 252, 253.

As shown in FIG. 2, a resilient sealing member 285 is seated in each oval seal groove 214, 274. In this embodiment, each sealing members 285 is made of urethane and is molded into the corresponding seal groove 214, 274.

Figure 9:
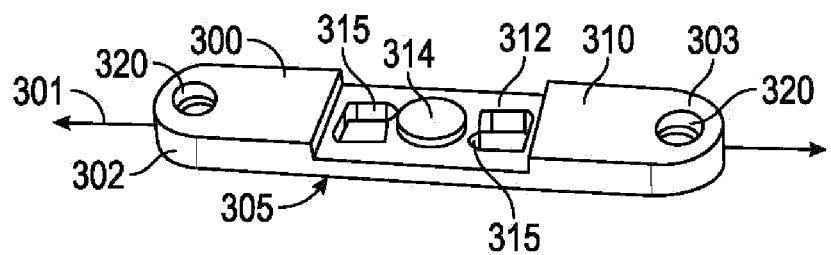
FIG. 9 is a perspective view of one valve retainer of FIG. 2.

Referring now to FIG. 9, each valve retainer 300 is a generally flat, elongate, rigid bar having a central or longitudinal axis 301, a first end 302, a second end 303 opposite first end 302, a first side or surface 305 extending between ends 302, 303, and a second side or surface 310 extending between ends 302, 303 and facing in the opposite direction as surface 305. When valve retainer 300 is coupled to valve body 130, first surface 305 is positioned radially adjacent valve body 130 and second surface 310 is positioned radially distal valve body 130. Valve retainer 300 may also be simply referred to as a "retainer."

Second surface 310 includes a rectangular recess 312 and a cylindrical boss 314 disposed in recess 312. In this embodiment, recess 312 and cylindrical boss 314 are centered along surface 310 between ends 302, 303. Second surface 310 also includes a plurality of through-holes 315 and a counter-bored hole 320 at each end 302, 303. Through holes 315 are disposed along recess 312 on opposite axial sides of boss 314. As shown, each through-hole 315 is rectangular with some curvature on the side closest to cylindrical boss 314.

Referring now to FIGS. 2, 3, and 7, discharge valve members 250 are positioned about valve body 130 within trough 143 radially adjacent a corresponding discharge aperture 165. A plurality of retainers 300 extend across each valve member 250 with its ends 302, 303 seated in mating attachment recesses 147 and fixedly secured to valve body 130 with fasteners 325 disposed in holes 320. Each retainer 300 coupling a valve member 250 to valve body 130 is disposed in a mating lateral channel 280. Longitudinal axis 301 of each retainer 300 is oriented parallel to the valve body central axis 131. One biasing member 330 is positioned between each retainer 300 and the corresponding valve member 250. In particular, each biasing member 330 has one end seated in recess 281 of the corresponding valve member 250 and the other end receiving boss 314 of the corresponding retainer 300. Through-holes 315 in retainers 300 can be used to facilitate adjusting or confirming the placement of biasing members 330.

Figure 10:
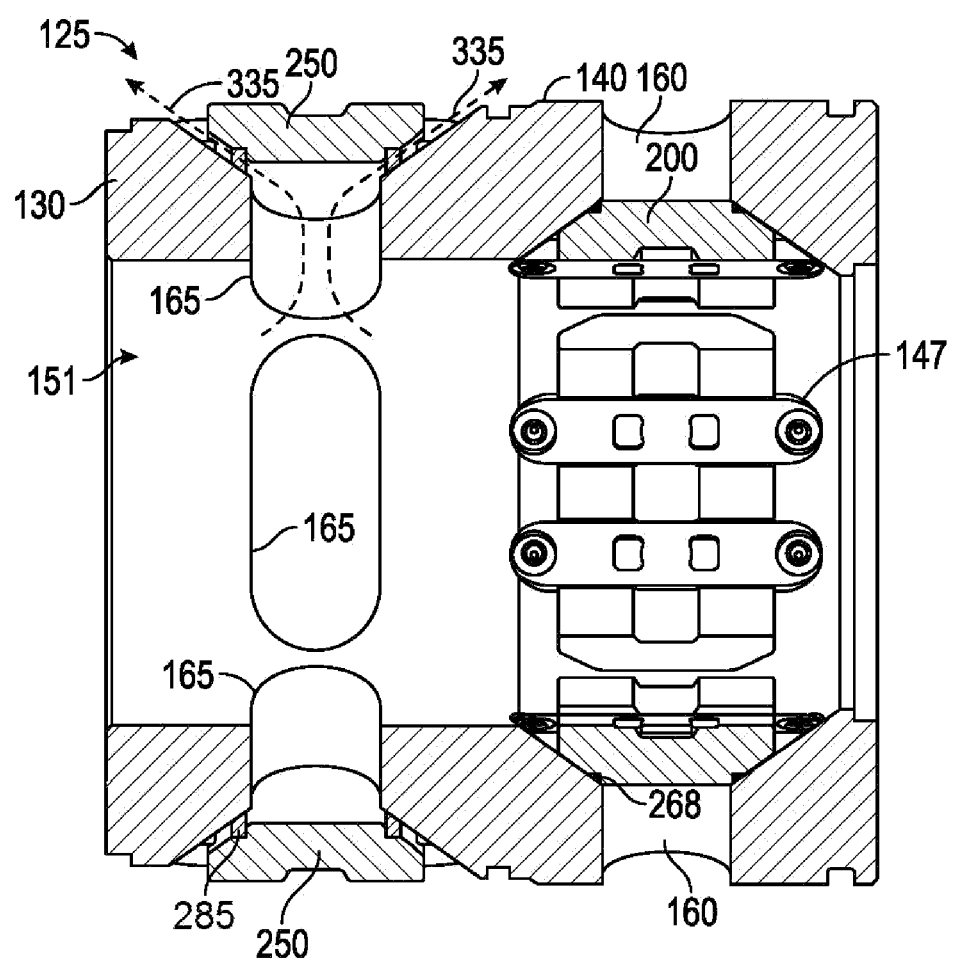
FIG. 10 is a cross-sectional view of the valve module of FIG. 2 with the suction valve members in the closed positions and the discharge valve members in the open positions.
Figure 11:
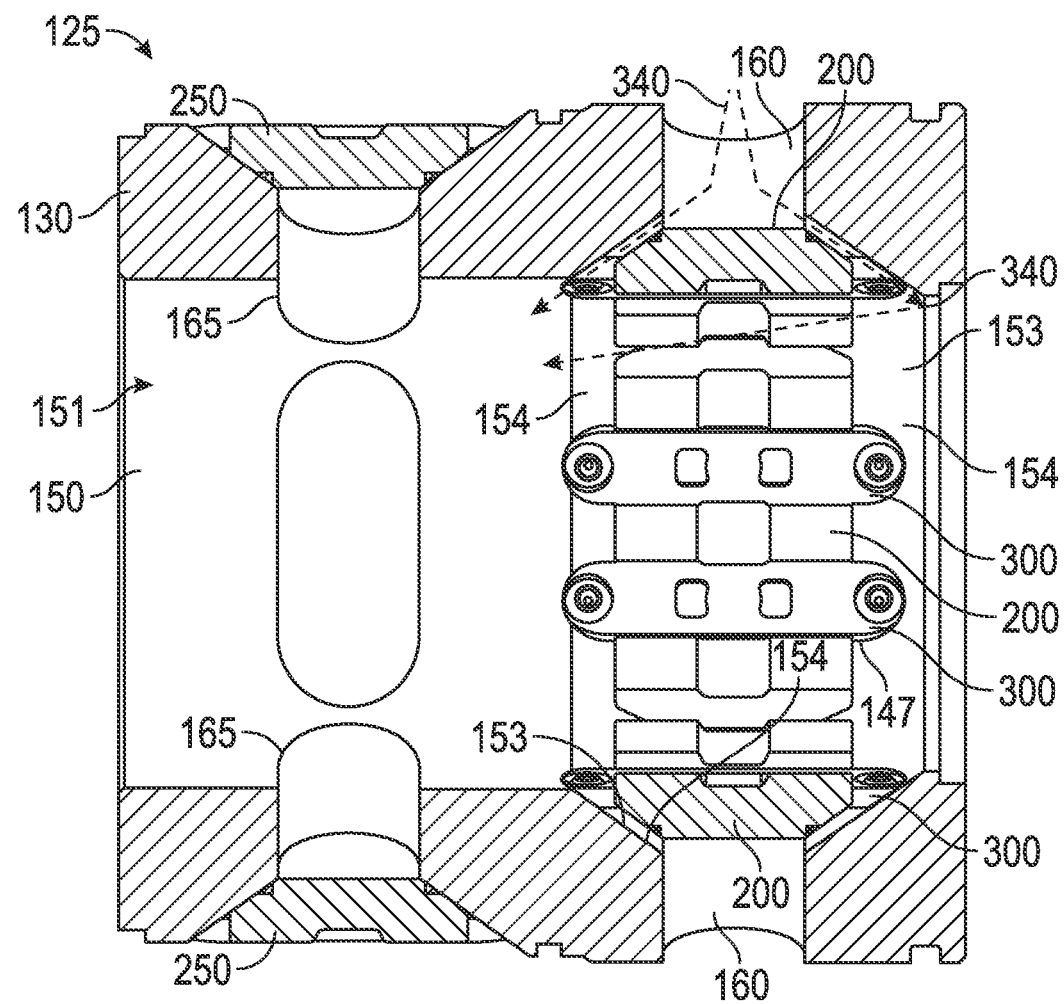
FIG. 11 is a cross-sectional view of the valve module of FIG. 2 with the suction valve members in the open positions and the discharge valve members in the closed positions.

Each discharge valve member 250 has an open position radially spaced from valve body 130 (FIG. 10) and a closed position engaging valve body 130 (FIG. 11). With one or more valve members 250 in the open position, inner chamber 151 of valve body 130, distribution channel 117, and discharge port 114 in valve block 105 are in fluid communication. However, when each valve member 250 is in the closed position, sealing members 285 are seated against valve seats 168 and inner chamber 151 of valve body 130 and discharge port 114 in valve block 105 are not in fluid communication. In this embodiment, biasing members 330 are positioned and oriented to exert a force directed radially inward with respect to valve body axis 131, and thus, bias valve members 250 to the closed positions. Valve members 250 move radially outward from valve body 130 and are transitioned from the closed positions to the open positions when the force generated by a pressure differential between inner chamber 151 and outlet port 114 is sufficiently larger (i.e., fluid pressure in inner chamber 151 is sufficiently greater than the fluid pressure in outlet port 114) to overcome the biasing forces of biasing members 330; and valve members 250 move radially inward into engagement with valve body 130 and are transitioned from the open positions to the closed positions when the biasing forces of biasing members 330 are greater than the force generated by the pressure differential between inner chamber 151 and outlet port 114 (i.e., fluid pressure in inner chamber 151 is not sufficiently greater than the fluid pressure in outlet port 112).

Referring now to FIGS. 2, 3, and 5, suction valve members 200 are positioned within valve body 130 within trough 153 radially adjacent a corresponding inlet aperture 160. A plurality of retainers 300 extend across each valve member 200 with its ends 302, 303 seated in mating attachment recesses 147 and fixedly secured to valve body 130 with fasteners 325 disposed in holes 320. Each retainer 300 coupling a valve member 200 to valve body 130 is disposed in a mating lateral channel 230. Longitudinal axis 301 of each retainer 300 is oriented parallel to the valve body central axis 131. Once biasing member 330 is positioned between each retainer 300 and the corresponding valve member 200. In particular, each biasing member 330 has one end seated in recess 231 of the corresponding valve member 200 and the other end receiving boss 314 of the corresponding retainer 300. Through-holes 315 in retainers 300 can be used to facilitate adjusting or confirming the placement of biasing members 330.

Each suction valve member 200 has an open position radially spaced from valve body 130 (FIG. 11) and a closed position engaging valve body 130 (FIG. 10). With one or more valve members 200 in the open position, inner chamber 151 of valve body 130, distribution channel 116, and inlet port 112 in valve block 105 are in fluid communication. However, when each valve member 200 is in the closed position, sealing members 285 are seated against valve seats 168 and inner chamber 151 of valve body 130 and inlet port 112 in valve block 105 are not in fluid communication. In this embodiment, biasing members 330 are positioned and oriented to exert a force directed radially outward with respect to valve body axis 131, and thus, bias valve members 200 to the closed positions. Valve members 200 move radially inward from valve body 130 and are transitioned from the closed positions to the open positions when the force generated by a pressure differential between inner chamber 151 and inlet port 112 is sufficiently larger (i.e., fluid pressure in inlet port 112 is sufficiently greater than the fluid pressure in inner chamber 151) to overcome the biasing forces of biasing members 330; and valve members 200 move radially inward into engagement with valve body 130 and are transitioned from the open positions to the closed positions when the biasing forces of biasing members 330 are greater than the force generated by the pressure differential between inner chamber 151 and inlet port 112 (i.e., fluid pressure in inlet port 112 is not sufficiently greater than the fluid pressure in inner chamber 151).

Referring now to FIGS. 1, 10, and 11, during pumping operations, a motor (not shown) drives the rotation of crankshaft 34, which results in the reciprocating axial translation of piston 22 relative to cylinder 20. As piston 22 reciprocates within bore 30, the volume of chamber 32 cyclically expands and contracts. Since chamber 32 is in fluid communication with inner fluid chamber 151 of valve assembly 125 via through-bore 110, the expansion and contraction of the volume within chamber 32 results in a decrease and increase, respectively, in the fluid pressure within fluid chamber 151. Thus, when piston 22 moves in the second direction 44, the volume in chamber 32 decreases, and the fluid pressure within fluid chamber 151 increases. In response to the increased fluid pressure, suction valve members 200 close, and discharge valve members 250 open. When discharge valve members 250 open, the pressurized fluid in chamber 151 moves through the flow paths 335 into the flow distribution channel 117, and into discharge port 114. When piston 22 reverses direction and moves in first direction 42, the volume in chamber 32 increases and fluid pressure in valve chamber 151 decreases. In response to the reduced fluid pressure, discharge valve members 250 close, and suction valve members 200 open. When suction valve members 200 are open, fluid passes from suction port 112, around the flow distribution channel 116, through flow paths 340, and into chamber 151 of valve body 130. The cycle then repeats as piston 22 reciprocates, cyclically drawing fluid from suction port 112, through fluid chamber 151 of valve assembly 125 and then discharging the fluid to port 114.

Valve assembly 125 is relatively compact in size as compared to conventional designs known in the art. Furthermore, in the embodiments shown, valve assembly 125 includes both suction and discharge valve as a single unit, simplifying installation and maintenance and placing the common "wear" components into the single, removable unit. The small size and single-unit design of valve assembly 125 also allows the fluid valve module 100 to be smaller than conventional designs for suction and discharge valve modules designed for similar flow rates. These features in the disclosed embodiments provide some advantages over conventional valve modules and valve assemblies. For example, smaller designs offer the potential for lower manufacturing costs, e.g. reduced materials costs, reduced transportation costs, and particular advantages on off-shore oil rigs where size and weight are critical factors in a system design. Operational advantages are also anticipated, such as reduced maintenance time, reduced materials costs for repair, reduced pump down-time, and therefore higher production rates at oil wells and other locations and facilities where pump 10 may be utilized.

Although valve body 130 of FIG. 3 includes four inlet or suction apertures 160 proximal outer end 133 and four outlet or discharge apertures 165 proximal inner end 132. Various other valve body embodiments have one, two, three, five, or any practical number of suction apertures 160 or one, two, three, five, or any practical number of discharge apertures 165. Valve assemblies that incorporate the various other valve body embodiments include a number of valve members 200, 250 corresponding to the number of apertures 160, 165, respectively. In some embodiments, a suction valve assembly has a valve body with one or more suction apertures 160 each coupling a suction valve member 200 but having no discharge apertures and no discharge valve members. In some other embodiments, a discharge valve assembly has valve body with one or more discharge apertures 160 each coupling a discharge valve member 250 but having no suction apertures and no suction valve members. Some embodiments of a fluid valve module designed in accordance with principles disclosed herein include a separate suction valve assembly and discharge valve assembly coupled or sealingly engaged in a valve block.

Although the longitudinal axis 301 (FIG. 9) of each retainers 300 is oriented parallel to the valve body central axis 131 in FIG. 3; in other embodiments, the longitudinal axis 301 of at least one retainer 300 may be oriented askew, not parallel and perhaps perpendicular, to the valve body central axis 131. Various other features would be modified to accommodate this change. Example features include the orientation of the longitudinal axis 161 of at least one suction slot 160 or the orientation of the longitudinal axis 166 of at least one discharge slot 165. Additional embodiments are contemplated and share characteristics of one or more of the embodiments disclosed herein.

While exemplary embodiments have been shown and described, modifications thereof can be made by one of ordinary skill in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily indicate that the particular step or operation is necessary to the method. Unless expressly stated otherwise, the steps or operations listed in a description of a method or in a method claim may be performed in any order, and in some implementations two or more of the method steps or operations may be performed in parallel, rather than serially. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A valve assembly, comprising:
   a valve body having a first end, a second end opposite the first end, an outer surface extending from the first end to the second end, and an inner surface extending from the first end to the second end, wherein the inner surface defines an inner fluid chamber having a central axis, wherein the valve body includes a first a aperture extending radially through the valve body from the outer surface to the inner fluid chamber;
   a first valve member moveably coupled to the valve body, wherein the first valve member is configured to move radially relative to the valve body between a closed position preventing fluid flow through the first aperture and an open position allowing fluid flow through the first aperture;
   a first retainer extending across the first aperture and the first valve member, wherein the first retainer has a first end fixedly attached to the valve body;
   a first biasing member coupled to the first retainer and the first valve member, wherein the first biasing member is configured to bias the first valve member to the closed position;
   wherein the first biasing member is radially positioned between the first retainer and the first valve member;
   wherein the first valve member, the first retainer, and the first biasing member are positioned radially outside the valve body.

2. The valve assembly of claim 1, wherein the first retainer has a second end fixedly attached to the valve body.

3. The valve assembly of claim 1, wherein the first retainer has a longitudinal axis oriented parallel to the central axis of the valve body.

4. The valve assembly of claim 1, wherein the first aperture is an elongated slot having a length and a width less than the length.

5. The valve assembly of claim 1, further comprising:
   a first plurality of circumferentially-spaced valve members, wherein the first plurality of circumferentially-spaced valve members includes the first valve member;
   wherein the valve body includes a first plurality of circumferentially-spaced apertures, wherein each aperture extends radially through the valve body from the outer surface to the inner fluid chamber, and wherein each valve member is moveably coupled to the valve body and is configured to move radially relative to the valve body between a closed position preventing fluid flow through one of the apertures and an open position allowing fluid flow through one of the apertures;
   a first plurality of retainers, wherein each retainer extends across one of the apertures and one of the valve members, and wherein each retainer has a first end fixedly attached to the valve body;
   a first plurality of biasing members, wherein one biasing member is radially positioned between one of the valve members and one of the retainers, wherein each biasing member is configured to bias the corresponding valve member to the closed position.

6. The valve assembly of claim 1, further comprising:
   a second valve member moveably coupled to the valve body;
   a second retainer; and
   a second biasing member;
   wherein the valve body includes a second aperture axially spaced from the first aperture and extending radially through the valve body from the outer surface to the inner fluid chamber;
   wherein the second valve member is configured to move radially relative to the valve body between a closed position preventing fluid flow through the second aperture and an open position allowing fluid flow through the second aperture;
   wherein the second retainer extends across the second aperture and the second valve member, wherein the second retainer has a first end fixedly attached to the valve body;
   wherein the second biasing member is radially positioned between the second retainer and the second valve member, wherein the second biasing member is configured to bias the second valve member to the closed position;

wherein the second valve member, the second retainer, and the second biasing member are positioned radially within the valve body.

7. The valve assembly of claim 4, wherein the first slot has a longitudinal axis extending circumferentially about the central axis.

8. The valve assembly of claim 5, further comprising:
a second plurality of circumferentially-spaced valve members axially spaced from the first plurality of circumferentially-spaced valve members;
wherein the valve body includes a second plurality of circumferentially-spaced apertures axially spaced from the first plurality of circumferentially-spaced apertures, wherein each of the second plurality of apertures extends radially through the valve body from the outer surface to the inner fluid chamber, and wherein each of the second plurality of valve members is moveably coupled to the valve body and is configured to move radially relative to the valve body between a closed position preventing fluid flow through one of the second plurality of apertures and an open position allowing fluid flow through one of the second plurality of apertures;
a second plurality of retainers, wherein each of the second plurality of retainers extends across one of the second plurality of apertures and one of the second plurality of valve members, and wherein each of the second plurality of retainers has a first end fixedly attached to the valve body;
a second plurality of biasing members, wherein one of the second plurality of biasing members is radially positioned between one of the second plurality of valve members and one of the second plurality of retainers, wherein each of the second plurality of biasing members is configured to bias the corresponding one of the second plurality of valve members to the closed position.

9. The valve assembly of claim 5, wherein the first plurality of valve members, the first plurality of retainers, and the first plurality of biasing members are disposed along the outer surface of the valve body; and
wherein the second plurality of valve members, the second plurality of retainers, and the second plurality of biasing members are disposed along the inner surface of the valve body.

10. A valve assembly, comprising:
a valve body having a first end, a second end axially opposite the first end, an outer surface extending axially from the first end to the second end, and inner surface defining an inner fluid chamber having a central axis, wherein the valve body includes a first elongated slot having a length and a width less than the length, wherein the first elongated slot extends radially through the valve body from the outer surface to the inner chamber;
a first elongated valve member having a length and a width less than the length, wherein the first valve member is moveably coupled to the valve body and is configured to move radially relative to the valve body between a closed position preventing fluid flow through the first slot and an open position allowing fluid flow through the first slot.

11. The valve assembly of claim 10 wherein the first slot has a longitudinal axis extending circumferentially about the central axis.

12. The valve assembly of claim 10, wherein the valve body includes a second elongated slot having a length and a width less than the length, wherein the second elongated slot extends radially through the valve body from the outer surface to the inner chamber;
a second elongated valve member having a length and a width less than the length, wherein the first valve member is moveably coupled to the valve body and is configured to move radially relative to the valve body between a closed position preventing fluid flow through the second slot and an open position allowing fluid flow through the second slot.

13. The valve assembly of claim 12, further comprising:
a first retainer extending across the first slot and the first valve member, wherein the first retainer has a first end fixedly attached to the valve body;
a first biasing member radially positioned between the first retainer and the first valve member, wherein the first biasing member is configured to bias the first valve member to the corresponding closed position;
a second retainer extending across the second slot and the second valve member, wherein the second retainer has a first end fixedly attached to the valve body;
a second biasing member radially positioned between the second retainer and the second valve member, wherein the first biasing member is configured to bias the second valve member to the corresponding closed position.

14. The valve assembly of claim 13, wherein the first valve member, the first retainer, and the first biasing member are positioned radially outside the valve body; and
wherein the first biasing member is radially positioned between the first retainer and the first valve member;
wherein the second valve member, the second retainer, and the second biasing member are positioned radially within the valve body;
wherein the second biasing member is radially positioned between the second retainer and the second valve member.

15. A pump, comprising:
a valve block including a first bore having a central axis and extending from an outer surface of the valve block, a second bore extending from the outer surface of the valve block to the first bore, and a third bore extending from the outer surface of the valve block to the first bore;
a valve assembly disposed in the first bore, wherein the valve assembly comprises:
a valve body having a first end, a second end axially opposite the first end, an outer surface extending axially from the first end to the second end, and inner surface defining an inner fluid chamber;
wherein the valve body includes a first inlet aperture and a first outlet aperture axially spaced from the first inlet aperture, wherein each aperture extends radially through the valve body from the outer surface of the valve body to the inner fluid chamber, wherein the first inlet aperture is axially aligned with the second bore of the valve block and the first outlet aperture is axially aligned with the third bore of the valve block;
a first valve member positioned in the inner fluid chamber and moveably coupled to the valve body, wherein the first valve member is configured to move radially relative to the valve body between a closed position preventing fluid flow through the first inlet aperture and an open position radially spaced from the valve body and configured to allow fluid flow through the first inlet aperture;

a second valve member positioned outside the valve body and moveably coupled to the valve body, wherein the second valve member is configured to move radially relative to the valve body between a closed position preventing fluid flow through the first outlet aperture and an open position radially spaced from the valve body and configured to allow fluid flow through the first outlet aperture.

16. The pump of claim 15, wherein each aperture is an elongated slot having a length, a width that is less than the length, and a longitudinal axis extending circumferentially about the central axis.

17. The pump of claim 15, wherein the valve assembly further comprises:

a first retainer extending across the first inlet aperture and the first valve member, wherein the first retainer has a first end fixedly attached to the valve body;

a first biasing member radially positioned between the first retainer and the first valve member, wherein the first biasing member is configured to bias the first valve member to the closed position;

a second retainer extending across the first outlet aperture and the second valve member, wherein the second retainer has a first end fixedly attached to the valve body; and a second biasing member radially positioned between the second retainer and the second valve member, wherein the second biasing member is configured to bias the second valve member to the closed position.

18. The pump of claim 15 wherein the valve body further includes a plurality of inlet apertures and a plurality of outlet apertures axially spaced from the inlet apertures, wherein the plurality of inlet apertures includes the first inlet aperture and the plurality of outlet apertures includes the first outlet aperture, wherein each aperture extends radially through the valve body from the outer surface of the valve body to the inner fluid chamber, wherein the inlet apertures are axially aligned with the second bore of the valve block and the outlet apertures are axially aligned with the third bore of the valve block;

wherein the valve assembly further includes:

a first plurality of valve members positioned in the inner fluid chamber and moveably coupled to the valve body, wherein the first plurality of valve members includes the first valve member, wherein each of the first plurality of valve members is configured to move radially relative to the valve body between a closed position preventing fluid flow through the corresponding inlet aperture and an open position radially spaced from the valve body and configured to allow fluid flow through one of the plurality of inlet apertures;

a second plurality of valve members positioned outside the valve body and moveably coupled to the valve body, wherein the second plurality of valve members includes the second valve member, wherein each of the second plurality of valve members is configured to move radially relative to the valve body between a closed position preventing fluid flow through the outlet aperture and an open position radially spaced from the valve body and configured to allow fluid flow through one of the plurality of outlet apertures.

* * * * *